UNITED STATES PATENT OFFICE.

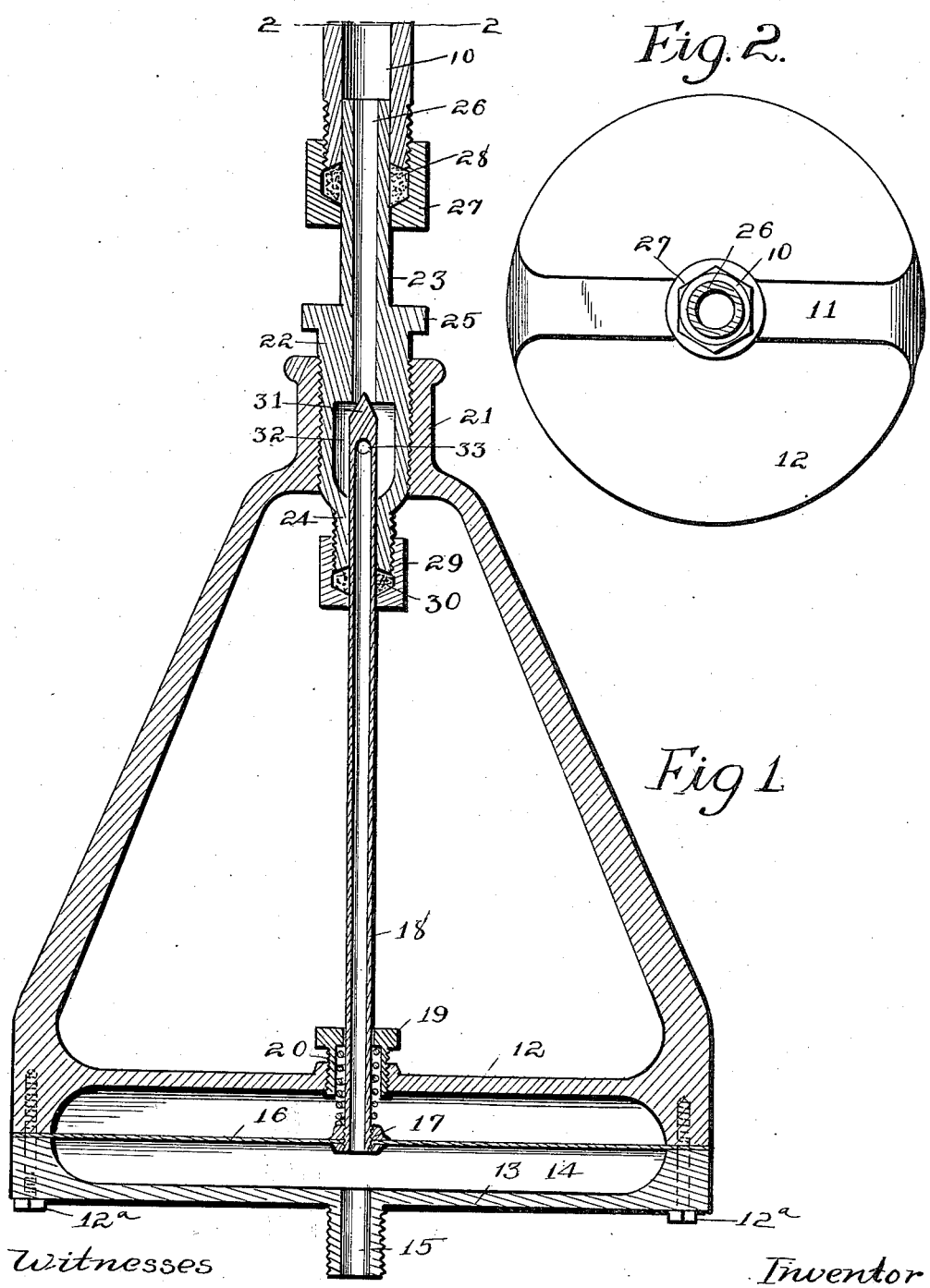

PETER J. SCHULER, OF NEW HAMPTON, IOWA.

PRESSURE-REGULATOR.

1,045,197.

Specification of Letters Patent.  Patented Nov. 26, 1912.

Application filed April 15, 1912. Serial No. 691,040.

*To all whom it may concern:*

Be it known that I, PETER J. SCHULER, a citizen of the United States, residing at New Hampton, in the county of Chickasaw and State of Iowa, have invented a new and useful Pressure-Regulator, of which the following is a specification.

The object of my invention is to provide a pressure regulator for maintaining the pressure of gas in a chamber at a certain predetermined point.

It is a further object to provide such a regulator of simple, durable and inexpensive construction, provided with a valve controlled by a diaphragm and provided also with means for regulating the position of the valve and thereby adjusting the mechanism for predetermining the pressure necessary to close the valve and for regulating the amount of inflowing vapor or gas when filling the pressure chamber.

A further object is to provide such a pressure regulator having means whereby greater or less tension may be imposed upon the diaphragm, thereby varying the pressure necessary to raise the diaphragm and close the valve.

My invention consists, in certain details, in the construction, arrangement and combination of the various parts of my device, whereby the objects contemplated are attained, as hereinafter more fully set forth, pointed out in my claims, and illustrated in the accompanying drawings, in which—

Figure 1 shows a central, vertical, sectional view of a pressure regulator embodying my invention. Fig. 2 shows a top or plan view of my pressure regulator partly in section, taken on the line 2—2 of Fig. 1.

In the accompanying drawings I have used the reference numeral 10 to indicate a pipe which may be connected with a boiler or other source of steam supply or with any gas producing device. Secured to a pressure chamber, preferably at the top thereof, is a bracket having upwardly and inwardly extending arms 11. At its lower end the bracket is provided with upper and lower horizontal partitions 12 and 13 between which is formed a chamber 14 for receiving a diaphragm. The partitions 12 and 13 are made separate from each other and may be secured together by means of screws 12ª. The chamber 14 is designed to communicate with the interior of the pressure chamber through the tube 15. Within the chamber 14 is a substantially horizontal flexible diaphragm 16, having at its center a collar 17. The collar 17 is constructed with a central, screwthreaded, vertical opening. Mounted in the collar 17 is a tube 18, the lower end of which is externally screwthreaded and is received in the central opening in said collar. The tube 18 extends upwardly through the partition 12. In the partition 12 is a central, screwthreaded opening in which is mounted a nut 19 which is provided with an opening in which the tube 18 slides freely. The nut 19 is provided with an enlarged opening in its lower side and mounted on the tube 18 between the collar 17 and the nut 19 and received within the enlarged opening in the nut 19, is an extensible coil spring 20. The arms 11 converge at their upper end and there form a substantially cylindrical block 21 in which is a central, vertical, screwthreaded opening. Mounted in the opening in the block 21 is an externally screwthreaded nut 22 having an upward extension 23 and a downward extension 24. Formed on the nut 22 above the block 21 is an angular flange 25 for operating the screw 22 with a wrench. The nut 22 and the extensions thereof are provided with a central, longitudinal opening 26 extending through the entire length of said parts. The extension 23 is slidably received in the pipe 10.

Mounted on the lower end of the pipe 10 and surrounding the extension 23 is a nut 27 in which the extension 23 slides freely. Within the nut 27 is packing material 28. The upper end of the tube 18 is slidably received in the opening of the extension 24 and the nut 22. The lower end of the extension 24 is screwthreaded externally and on said end is a nut 29 in which the tube 18 slides freely and in which is packing material 30. The upper end of the tube 18 is closed and forms a pointed needle valve 31. The nut 22 is provided with an enlarged opening 32 in its interior and the portion of the nut 22 at the upper end of the opening 32, and around the opening 26, forms a seat for the needle valve 31. The tube 18 is provided with openings 33 at its upper end which communicate with the opening in the center of said tube.

In the practical use of my improved pressure regulating device, the tension on the diaphragm 16 may be regulated by screwing the nut 19 up or down and thereby decreasing or increasing the tension of the spring 20. The amount of pressure necessary to raise the diaphragm and close the needle valve may be thereby predetermined. The nut 22 may be screwed up or down in the block 21 and the sides of the opening around the needle valve may be thereby increased or decreased and the speed of the inflowing gas or vapor may be thereby regulated. The amount of pressure needed to close the needle valve may also be regulated by means of the screw 22.

Among the advantages of my device, are its extreme simplicity of construction, its cheapness and its durability. None of the parts are complicated and practically all of the parts are detachable so that they may be easily removed for repairing or replacing them. The construction of my device gives adjustability in a high degree, since the pressure may be regulated by means of the nut 19 and also by means of the nut 22. The speed of the inflowing gas or vapor may be regulated by the nut 22.

It will be noted that there may be many changes in the details of construction of my device without departing from its essential features.

I claim as my invention:

1. In a device of the class described, a bracket, a chamber formed at the lower end thereof, provided with an opening designed to communicate with a pressure chamber, a flexible diaphragm in said first chamber, a tube connected therewith extending upwardly through the top of said chamber, adjustable means for imposing yielding pressure on the upper side of said diaphragm, a block formed at the upper end of said bracket, provided with a screwthreaded vertical opening, a screw mounted in said vertical opening having upward and downward extensions and provided with a longitudinal opening through its entire length, said screw being also provided with an enlargement of said vertical opening, above which enlargement is formed a valve seat, the upper end of said tube being closed to form a needle valve which coacts with said valve seat, said tube being provided with openings in its upper end which communicate with its interior and with the enlarged opening in said screw.

2. In a device of the class described, a chamber having an opening in its lower side designed to communicate with a pressure chamber, a flexible diaphragm in said chamber, a tube secured to said diaphragm and extending to the lower side thereof, said tube being slidably mounted in the upper wall of said chamber, adjustable means for imposing yielding pressure in the upper side of said diaphragm, an adjustable tube in which the upper end of said first tube is slidably received, a valve seat formed in said adjustable tube, the upper end of said first tube being closed and pointed to form a needle valve, and being received in said second tube in position to coact with said valve seat, said first tube being provided with openings communicating with the interior thereof and with the opening in said second tube below the valve seat therein.

Des Moines, Iowa, March 8, 1912.

PETER J. SCHULER.

Witnesses:
MARTHA L. HEMMAN,
M. E. GEISER.

---

Copies of this patent may be obtained for five cents each, by addressing the "Commissioner of Patents, Washington, D. C."